United States Patent
Duck et al.

[11] Patent Number: 5,808,763
[45] Date of Patent: Sep. 15, 1998

[54] OPTICAL DEMULTIPLEXOR

[75] Inventors: Gary Stephen Duck; Y. Calvin Si, both of Nepean; Neil Teitelbaum, Ottawa, all of Canada

[73] Assignee: JDS Fitel Inc., Nepean, Canada

[21] Appl. No.: 550,730

[22] Filed: Oct. 31, 1995

[51] Int. Cl.⁶ ............................................. H04J 14/02
[52] U.S. Cl. ..................... 359/127; 359/131; 359/129
[58] Field of Search ............................ 359/127, 129, 359/130, 131, 133, 115

[56] References Cited

U.S. PATENT DOCUMENTS

| | | | |
|---|---|---|---|
| 4,244,045 | 1/1981 | Nosu et al. ............................ | 359/129 |
| 4,474,424 | 10/1984 | Wagner .................................. | 359/130 |
| 4,630,255 | 12/1986 | Gouali et al. ........................ | 359/130 |
| 4,707,064 | 11/1987 | Dobrowolski et al. ............... | 359/127 |
| 4,723,829 | 2/1988 | Koonen ................................. | 359/130 |
| 4,773,063 | 9/1988 | Hunsperger et al. ................. | 359/127 |
| 4,836,634 | 6/1989 | Laude ................................... | 359/130 |
| 5,107,359 | 4/1992 | Ohuchida .............................. | 359/124 |
| 5,583,683 | 12/1996 | Scobey ................................. | 359/127 |

*Primary Examiner*—Rafael Bacares
*Attorney, Agent, or Firm*—Neil Teitelbaum & Associates

[57] ABSTRACT

An optical demultiplexor utilizes a single optical interference filter disposed between an input end and an output end of the device. The filter is preferably housed within a cavity in a glass block having an upstanding input end, endwall. The optical filter is a wavelength selective means having a wavelength characteristic dependent upon an angle of incidence. The device has a plurality of reflective surfaces disposed at the input end for reflecting light reflected from the filter, back to the filter at different predetermined angles. Each different predetermined incident angle allows a different predetermined wavelength of light to pass through the filter to an output end being spatially separated from other predetermined wavelengths that pass through the filter. The reflective surfaces are preferably formed in the upstanding endwall of the glass block. Sixteen channels can be separated by this demultiplexor.

19 Claims, 5 Drawing Sheets

OPTICAL DEMULTIPLEXOR

FIELD OF THE INVENTION

This invention relates generally wavelength division multiplexed optical communication systems and more particularly to an optical wavelength division demultiplexor capable of utilizing an optical interference filter to demultiplex a plurality of wavelengths of light.

BACKGROUND OF THE INVENTION

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a microscopically small fraction of the available bandwidth of the fiber (typically a few GHz out of several tens of THz). By transmitting several channels at different optical wavelengths into an fiber (i.e., wavelength division multiplexing, or WDM), this bandwidth may be more efficiently utilized.

There have been many attempts to develop a compact, high resolution waveguide demultiplexor or spectrometer for application in areas such as spectroscopy, optical networks and optical links and more particularly optical communication systems. Such a demultiplexor can be extremely critical in wavelength division multiplexing (WDM) links. In these links or networks, each channel is assigned a distinct and unique wavelength for data transmission.. Thus, the optical fiber that connects channels in a WDM network carries many discrete wavelength channels and a particular wavelength is selected before the data is received. The data reception can be achieved by combining a wavelength demultiplexor, photodetectors and electronic selection circuitries. In WDM links, many wavelengths are multiplexed and transmitted through a single optical fiber to increase the capacity of the fiber. The receiver must demultiplex the many wavelengths and select the proper channel for reception. In these applications, the requirements on the wavelength demultiplexor are typically: an optical bandwidth>30 nm, a wavelength resolution of a few angstroms, polarization insensitivity, compactness, low loss, low crosstalk, and a low manufacturing cost.

At present, there are many known methods of selecting particular wavelengths, however, none are ideal for the applications outlined above. Such methods rely either on bulk optics or waveguide structures where the frequency selective element is either an interference grating or a Fabry-Perot (F-P) cavity. Bulk optics are generally too large and expensive for fiber based WDM applications. Diffraction gratings have been known for many years and produce a high resolution spectrum where the wavelength is a function of the diffracted angle. Thus a single grating can demultiplex many wavelengths. However, available bulk gratings have generally been expensive and difficult to use with optical fibers; another known drawback to these grating is their large physical size.

Techniques for multiplexing and demultiplexing between a single optical fiber comprising the multiplexed channel and plural optical fibers comprising the plural demultiplexed channels are described in various U.S. patents. For example, multiplexing/demultiplexing with birefringent elements is disclosed in U.S. Pat. Nos. 4,744,075 and 4,745,991. Multiplexing/demultiplexing using optical bandpass filters (such as a resonant cavity) is disclosed in U.S. Pat. Nos. 4,707,064 and 5,111,519. Multiplexing/demultiplexing with interference filters is disclosed in U.S. Pat. Nos. 4,474,424 and 4,630,255 and 4,735,478. Multiplexing/demultiplexing using a prism is disclosed in U.S. Pat. No. 4,335,933. U.S. Pat. No. 4,740,951 teaches a complex sequence of cascaded gratings to demultiplex plural optical signals. U.S. Pat. Nos. 4,756,587 and 4,989,937 and 4,690,489 disclose optical coupling between adjacent waveguides to achieve a demultiplexing function. A similar technique is disclosed in U.S. Pat. No. 4,900,118. Unfortunately, the foregoing techniques are limited by their discrete components to a small number of wavelengths in the multiplexed channel.

Thus, there is a need for compact, manufacturable wavelength division multiplexing(WDM) device for telecommunications purposes and for other applications that is relatively easy and inexpensive to manufacture.

It is therefore an object of this invention to provide an optical demultiplexor that is relatively inexpensive to manufacture, compact, and that utilizes few optical components.

It is a further object of this invention to provide an optical demultiplexor that is capable of demultiplexing at least 4 channels utilizing a single optical filter.

SUMMARY OF THE INVENTION

In accordance with the invention, there is provided, an optical demultiplexor comprising:
an input end and an output end;
wavelength selective means disposed between the input end and the output end, said wavelength selective means having a wavelength characteristic dependent upon an angle of incidence for transmitting light of a first predetermined wavelength and reflecting other wavelengths of light;
an input port at the input end for launching a beam toward the wavelength selective means at a first predetermined angle to allow a first predetermined wavelength of light to pass therethrough; and,
reflective means, positioned to direct at least a portion of the collimated beam reflected from the wavelength selective means, back to the wavelength selective means, at a second, different, predetermined angle to allow a second predetermined wavelength of light to pass through said wavelength selective means.

In accordance with the invention there is farther provided, an optical demultiplexor comprising:
a housing having an input end and an output end, the input end having an upstanding endwall;
wavelength selective means disposed between the input end and the output end, said wavelength selective means having a wavelength characteristic dependent upon an angle of incidence for transmitting light of a first predetermined wavelength and reflecting other wavelengths of light;
an input port at the input end for launching a collimated beam toward the wavelength selective means at a first predetermined angle to allow a first predetermined wavelength of light to pass therethrough;
a first reflective means defined within the upstanding wall, positioned to direct at least a portion of the collimated beam reflected from the wavelength selective means, back to the wavelength selective means at a second, different, predetermined incident angle to allow a second predetermined wavelength of light to pass through said wavelength selective means; and a second reflective means defined within the upstanding wall, positioned to direct at least a portion of the collimated beam reflected from the wavelength selective means, back to the wavelength selective means at a third, different, predetermined incident angle to allow a third predetermined wavelength of light to pass through said wavelength selective means.

In accordance with the invention there is further provided, an optical demultiplexor comprising:

an input end and an output end;

a single wavelength selective means disposed between the input end and the output end, said wavelength selective means having a wavelength characteristic dependent upon an angle of incidence for transmitting fight of a first predetermined wavelength and reflecting other wavelengths of light;

an input port at the input end for launching a beam toward the wavelength selective means at a first predetermined angle to allow a first predetermined wavelength of light to pass therethrough;

reflective means, positioned to direct at least a portion of the collimated beam reflected from the wavelength selective means, back to the wavelength selective means at a plurality of different predetermined angles to allow a plurality of different predetermined wavelengths of light to pass through said wavelength selective means at a plurality of different angles; and, a plurality of ports disposed at or near the output end to receive the different predetermined wavelengths of light that pass through the wavelength selective means.

Advantageously, by using a single optical interference filter instead of multiple filters, temperature stabilization circuitry becomes for more simple. In the case where multiple filters are required for the demultiplexing of multiple channels or wavelengths, as is described in prior art designs, different filters drift at different rates as a function of temperature variation. Thus, temperature compensation for multiple filter designs is substantially more complex.

Furthermore, by using a single filter in a reflective, folded configuration, as is provided by this invention, a compact device having a minimal number of costly optical components is provided.

BRIEF DESCRIPTION OF THE DRAWINGS

Exemplary embodiments of the invention will now be described in conjunction with the drawings in which.

DETAILED DESCRIPTION

Figure 1:
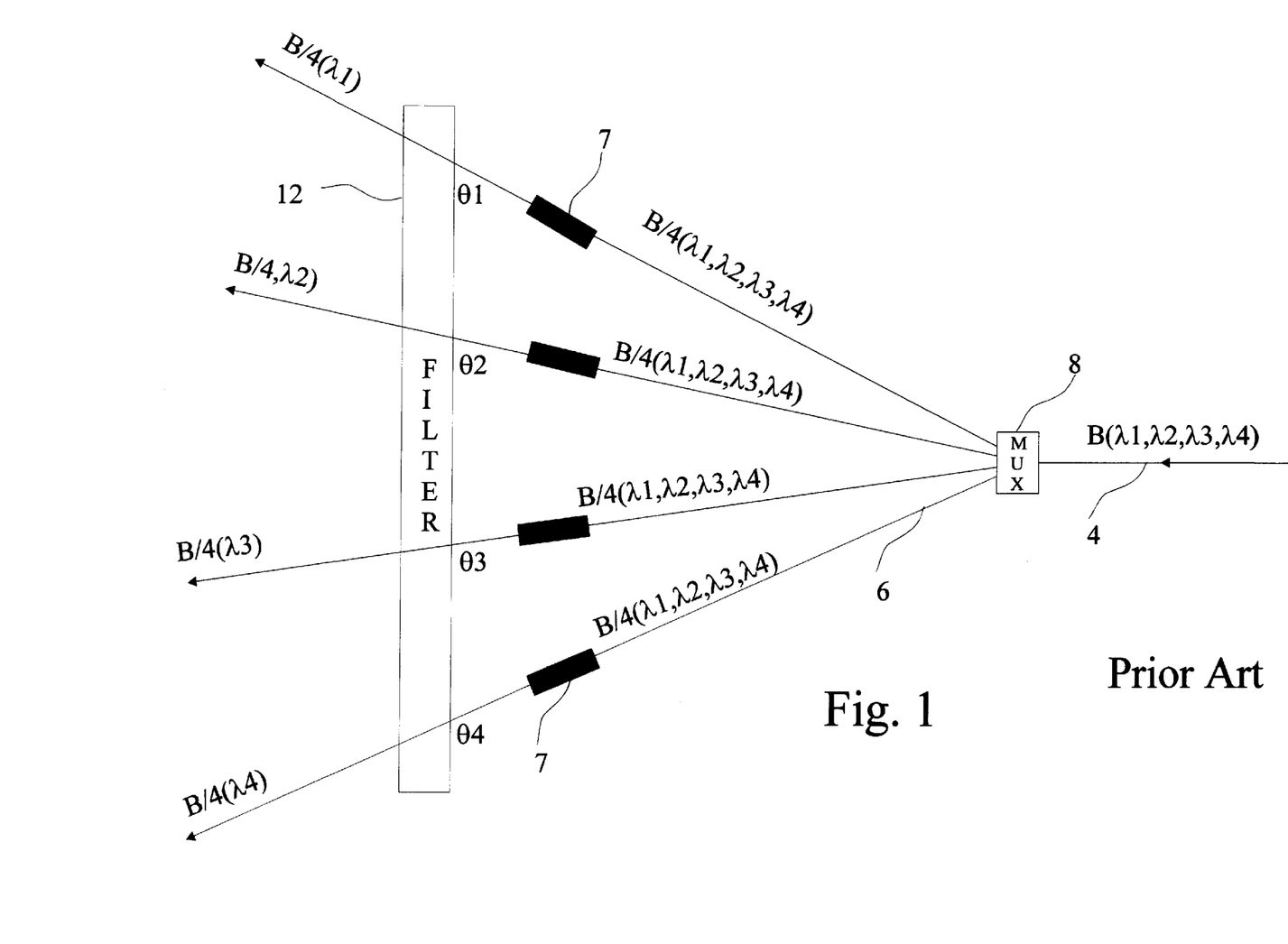
FIG. 1 is an illustration of a prior art optical demultiplexing arrangement utilizing a single filter to demultiplex 4 wavelengths of light.

Turning now to FIG. 1, a prior art demultiplexor is shown having an input beam B($\lambda 1$, $\lambda 2$, $\lambda 3$, $\lambda 4$) launched into an optical fiber 4 at an input side of a 1 to 4 wavelength independent optical splitter 8. A first output beam B/4($\lambda 1$, $\lambda 2$, $\lambda 3$, $\lambda 4$) having ¼ of the power of the input beam, is launched into an optical fiber 6 to a lens 7 positioned to focus a beam at a predetermined angle $\theta 1$ at wavelength selective means in the form of an optical interference filter 12. The interference filter 12 has a wavelength characteristic that is dependent upon an angle of incidence. Thus when light is directed at the filter 12 at a predetermined incident angle the filter 12 transmits light of a predetermined wavelength and reflects other wavelengths of light. At an angle of, for example, $\theta 1$ light of a predetermined wavelength $\lambda 1$ is transmitted and other wavelengths, $\lambda 2$, $\lambda 3$, $\lambda 4$ are reflected. Second, third, and fourth other input beams B/4($\lambda 1$, $\lambda 2$, $\lambda 3$, $\lambda 4$) each having ¼ of the output power of the input beam are directed through lenses 7 at the filter 12 at predetermined incident angles $\theta 2$, $\theta 3$, and $\theta 4$ respectively. The angles are calculated such that when light is directed at the filter at angle $\theta 2$, only light of wavelength $\lambda 2$ is passed by the filter. When light is directed at the filter at angles $\theta 3$ or $\theta 4$, only light of wavelength $\lambda 3$ or $\lambda 4$ is passed by the filter, respectively. Although this prior art device performs a function of demultiplexing of the input beam B($\lambda 1$, $\lambda 2$, $\lambda 3$, $\lambda 4$) into 4 output beams, this is done at the expense of sacrificing more than 75% of the input signal power.

Figure 2:
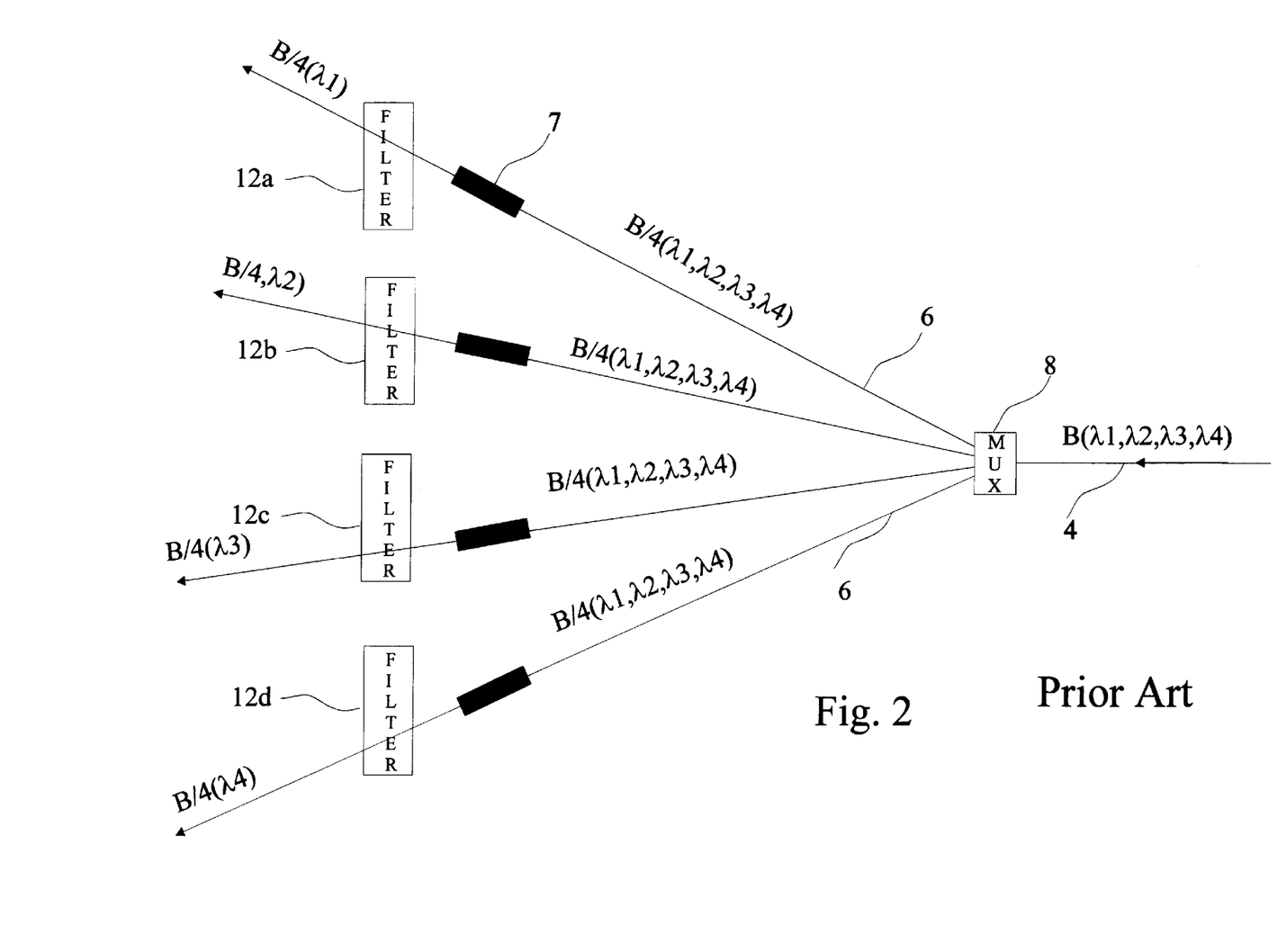
FIG. 2 is an illustration of a prior art optical demultiplexing arrangement utilizing our filters to demultiplex 4 wavelengths of light.

Another similar demultiplexor is shown in prior art FIG. 2, wherein an input beam is launched via an input fiber 4 into a splitter 8 and is split into 4 output beams each having ¼ of the power of the input beam. Thus at best, if each of the 4 output beams are demultiplexed with no loss, each of the demultiplexed channels will only have one quarter of the power that was present in the input beam. The demultiplexor in this embodiment includes 4 separate interference filters 12a, 12b, 12c, and 12d. By providing 4 separate filters, the filters and the angle of incidence may be designed to demultiplex the 4 separate channels or wavelengths. Although this may be seen as an advantage by some, it is far more difficult and costly to provide 4 precise filters rather than the single filter as is shown in FIG. 1; and, in an eight channel demultiplexor, 8 precision filters would be necessary utilizing the FIG. 2 embodiment. For example a demultiplexor capable of demultiplexing 8 channels each having a 1 nm bandwidth and spacing of 1.6 nm, made with 8 separate filters would be extremely difficult to manufacture and is not considered practicable. Furthermore, temperature compensation for such a device would be highly complex and expensive to provide.

Figure 3:
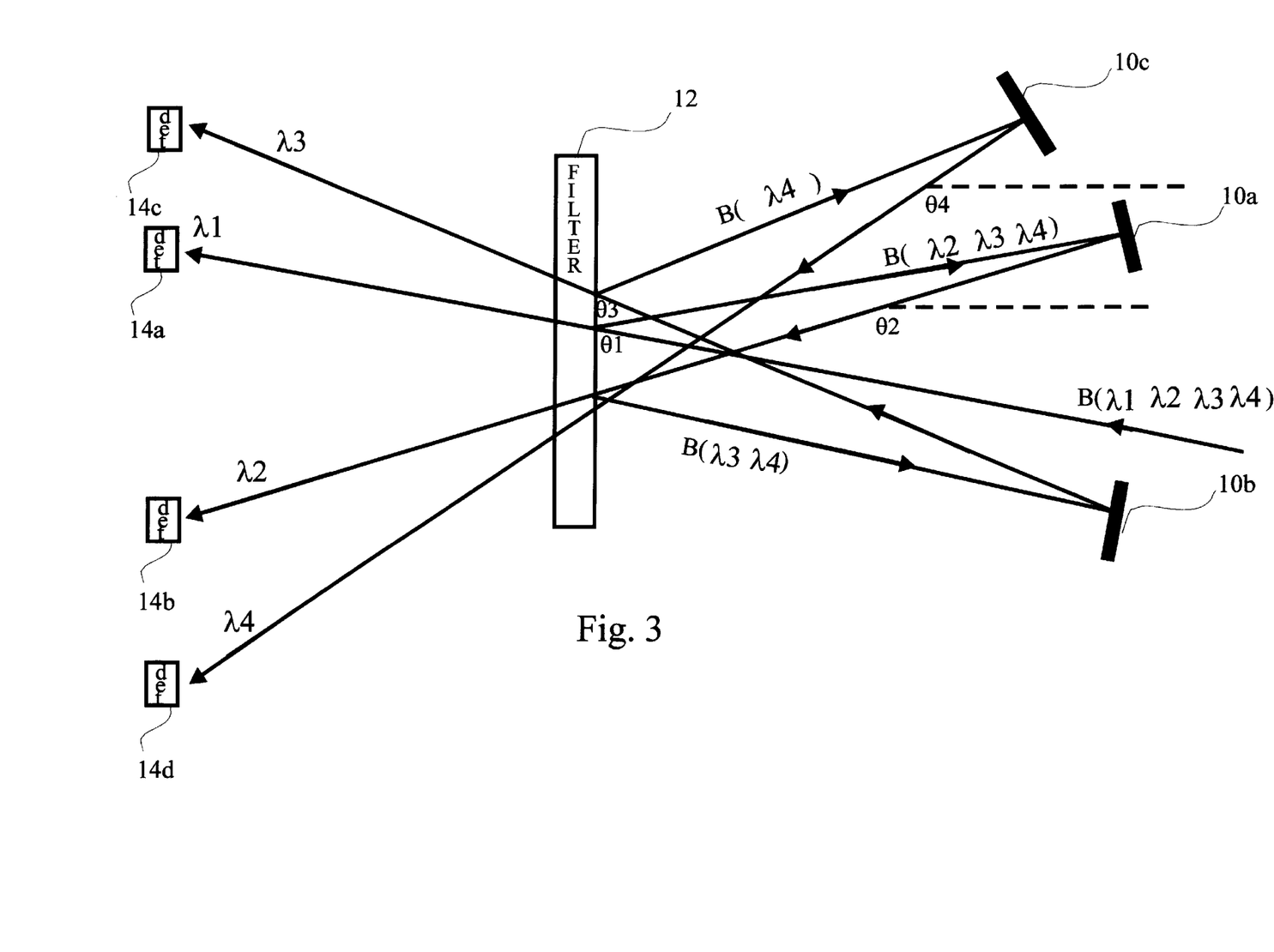
FIG. 3 is an illustration of a optical demultiplexing device in accordance with an embodiment of the invention; and, FIG. 4 is an illustration of a optical demultiplexing device in accordance with an alternative embodiment of the invention.

In contrast, turning now to FIG. 3, a first embodiment of the invention illustrates a demultiplexor having a single optical interference filter 12, and having three spaced apart reflecting surfaces in the form of mirrors, 10a, 10b, and 10c. Each of the mirrors are disposed in such as manner about an input side of the filter 12 as to reflect a beam incident upon them towards the filter 12 at a different predetermined incident angle. Thus, the mirror 10a is critically positioned to reflect an incoming beam (as shown) at the filter 12 at a predetermined angle $\theta 2$. Similarly, the mirrors 10b, and 10c are each precisely positioned to reflect an incoming beam (as shown) at the filter 12 at angles $\theta 3$ and $\theta 4$ respectively. Detectors 14a, 14b, 14c, and 14d, are positioned on the output side of the filter 12 to detect light of wavelengths $\lambda 1$, $\lambda 2$, $\lambda 3$, and $\lambda 4$, respectively. The optical interference filter can be made quite small, thus providing a compact relatively inexpensive device. For example, in some instances, an endface of the working surface area of the optical interference filter is approximately between 1.5 and 10 times the size of the beam launched from the input port toward the endface of the optical interference filter 12.

The operation of the demultiplexor will now be described in conjunction with FIG. 3. An input beam B(λ1, λ2, λ3, λ4) is launched at a critical, predetermined angle λ1 at the interference filter 12. The filter 12 is designed to pass light at a wavelength λ1 that is incident upon it at an angle of θ1, and to reflect other wavelengths of light λ2, λ3, and λ4 incident upon the filter at the angle of θ1. As can be seen, light of wavelength λ1 passes through the filter and light of wavelength λ2, λ3, and λ4 is reflected, exemplified by the reflected beam B(λ2, λ3, λ4). The mirror 10a is positioned to reflect the beam B(λ2, λ3, λ4) toward the filter 12 at a critical predetermined angle θ2. The filter 12 is designed to pass light at a wavelength λ2 that is incident upon it at an angle of θ2, and to reflect other wavelengths of light λ3, and λ4 incident upon the filter at the angle θ2. Thus, light of wavelength λ2 is passed by the filter, and the beam B(λ3, λ4) is reflected from the filter 12 to the mirror 10b that is precisely positioned to reflect the beam B(λ3, λ4) toward the filter at an incident angle of θ3. Light of wavelength λ3 passes through the filter, and the remaining beam B(λ4) of wavelength λ4 is reflected back to the mirror 10c that is precisely positioned to reflect the beam B(λ4) back to the filter 12 at a predetermined critical incident angle of θ3 degrees. The beam of light of wavelength λ4 then passes through the filter 12. Conveniently this arrangement allows a single interference filter with predetermined known reflectance and transmittance properties that change with angle of incidence to be utilized to separate or demultiplex a single beam of light into a plurality of separate wavelengths of light or channels. Detectors 14a through 14d are positioned to receive the light beams of wavelength λ1 through λ4 respectively. Alternatively, the detectors can be replaced by output ports for coupling or porting the separate beams of light to other locations. In the embodiment shown the mirrors 10a, 10b, and 10c are preferably 100% reflective, however other embodiments may be embraced depending upon particular circumstances and requirements. For example, by providing one or more mirrors 10a through 10c that allow a some small percentage of light to pass therethrough, a tap is provided for tapping a small amount of light from one or more of the beams B(λ4), B(λ3, λ4), or B(λ2, λ3, λ4). The embodiment described heretofore, in accordance with the invention, may be fabricated in a number of different ways. For example, discrete components may be used, however, relatively precisely positioning the mirrors 10a through 10c at predetermined angles with the filter 12 may within small tolerances demands high precision. Alternatively, the demultiplexing device can be fabricated in part from a glass block having at least an end wall in which to form coated mirrored surfaces that will reflect light at predetermined angles. This embodiment will be described in more detail in conjunction with FIG. 4.

Figure 4:
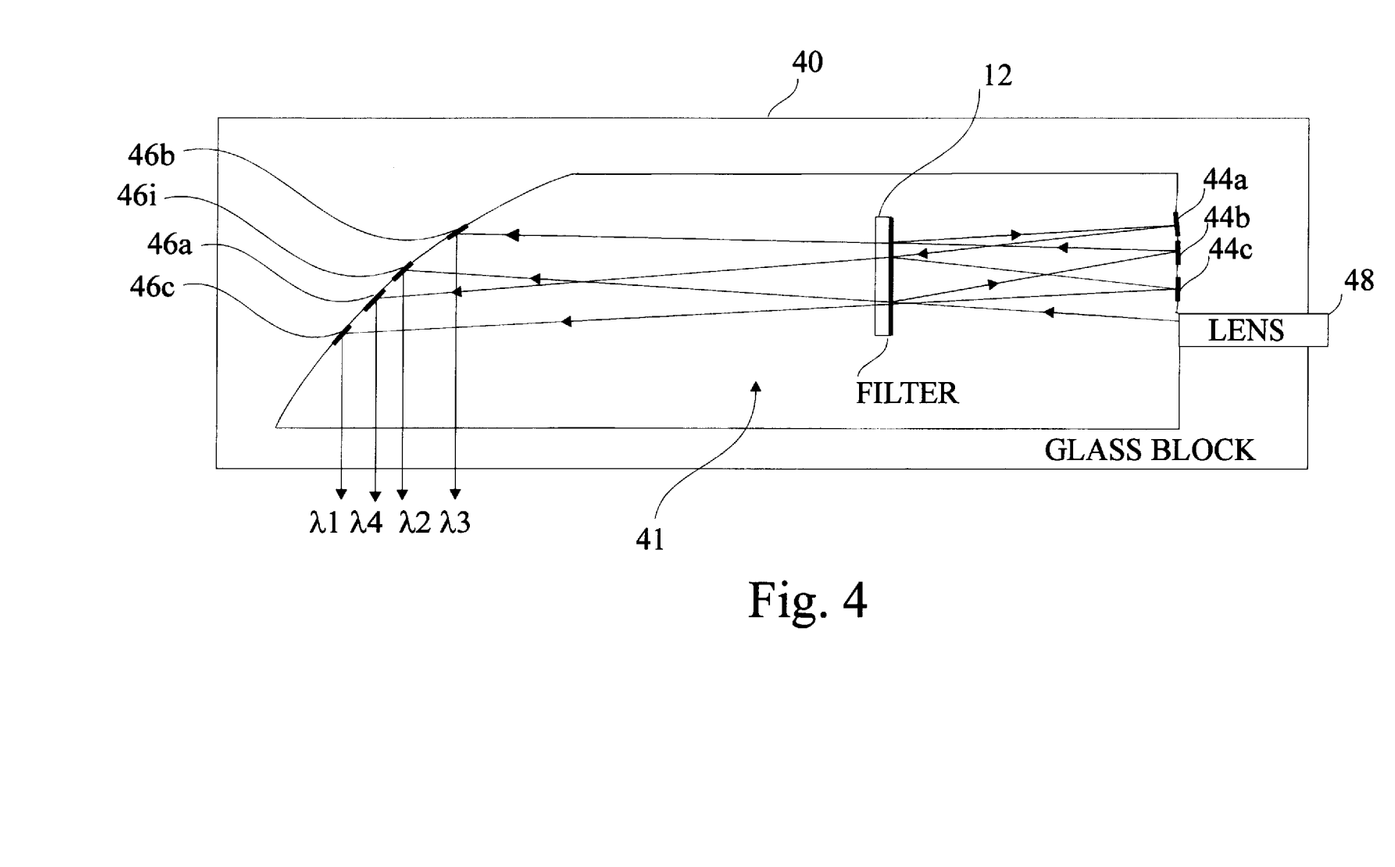

Turning now to FIG. 4, a demultiplexor is shown that includes and is contained within a glass block 40. An interference filter 12, approximately 2 mm×2 mm, is housed within the otherwise vacant interior 41 of the glass block 40; thus, the block 40 is essentially a shell, providing a housing and providing reflective coated surfaces that serve as mirrors. At an input end of the glass block 40, at the input side of the demultiplexor, are three polished surfaces 44a, 44b, and 44c polished to predetermined angles 3.035°, 0.717°, and 2.735° respectively, with respect to the planar face of the filter 12. Of course, the particular angles selected are dependent upon the location of the mirrors, their distance from the filter, and on the design of the interference filter 12. The surfaces 44a, 44b, and 44c are coated with a reflective coating. Of course the predetermined angles of the surfaces are selected in accordance with the design of the interference filter 12. An input beam is provided to the demultiplexor via a collimating lens 48 at an incline of approximately 4.47°. In some instances, the input angle is tuned or varied insubstantially to compensate for angle tolerance. At an output side of the device, four polished reflective coated surfaces 46i, 46b, 46c, and 46d are disposed at predetermined locations to reflect 4 separated channels to 4 output ports (not shown). It should be noted, that the glass block 40 providing a shell, could alternatively be fabricated using a plurality of other materials. For instance, the block could be made of a plastic material. Furthermore, the reflective surfaces 44a, 44b, and 44c may alternatively be in the form of discrete reflectors or partial reflectors. The number of channels or wavelengths that can be demultiplexed should not be confined to four as shown in FIG. 3 and 4. Simulated designs indicate, for example, that eight wavelengths can be demultiplexed utilizing additional reflective surfaces in a similar configuration in accordance with the principles of this invention.

Figure 5:
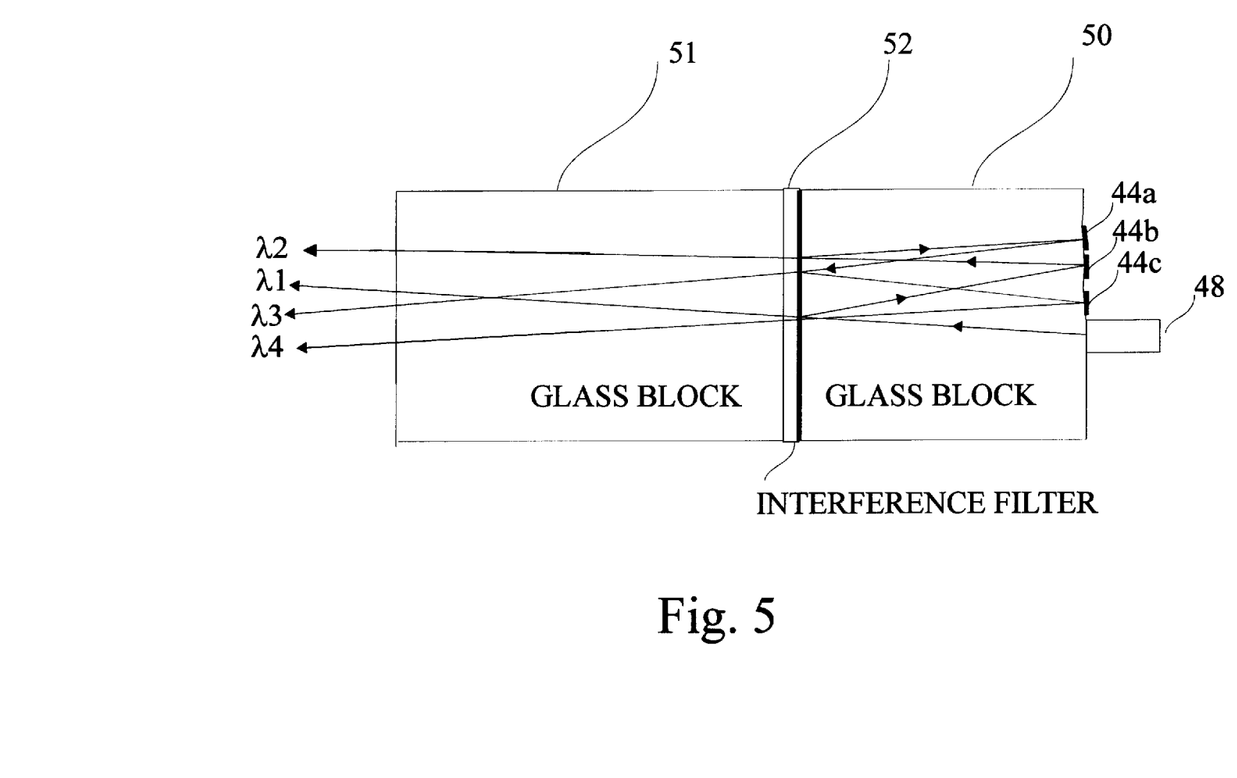
FIG. 5 is an illustration of a optical demultiplexing device in accordance with an alternative embodiment of the invention.

Referring now to FIG. 5, an alternative embodiment of the invention is shown, wherein an interference filter 52 is sandwiched between two solid glass blocks 50 and 51. Essentially, this embodiment functions in the same manner as in the embodiment described heretofore, of FIG. 4, however, light propagating within the device travels through glass instead of air. From a manufacturing point of view, this embodiment is preferred.

Of course numerous other embodiments may be envisaged without departing from the spirit and scope of the invention.

What we claim is:

1. An optical demultiplexor comprising:
    an input end and an output end;
    a single wavelength selective means disposed between the input end and the output end, said single wavelength selective means having a wavelength characteristic dependent upon an angle of incidence for transmitting light of a first predetermined wavelength and reflecting other wavelengths of light;
    an input port at the input end for launching a beam toward the single wavelength selective means at a first predetermined angle to allow a first predetermined wavelength of light to pass therethrough; and,
    reflective means, positioned to direct at least a portion of the beam reflected from the single wavelength selective means back to the single wavelength selective means, at a second, different, fixed, predetermined angle, dependent upon an angle of incidence and irrespective of wavelength to allow a second predetermined wavelength of light to pass through said wavelength selective means to the output end, while reflecting other wavelengths of light toward another reflective means.

2. An optical demultiplexor as defined in claim 1, wherein the reflective means are wavelength independent reflective means positioned to direct at least a portion of the collimated beam reflected from the sin wavelength selective means, back to the single wavelength selective means at a third, different, predetermined angle-dependent upon angle of incidence and independent of wavelength, to allow a third, different predetermined wavelength of light to pass therethrough said single wavelength selective means.

3. An optical demultiplexor as defined in claim 2, wherein the reflective means comprise a plurality of discrete reflective elements.

4. An optical demultiplexor as defined in claim 2, wherein the reflective means comprise a plurality of discrete mirrors having a reflectance of at least 97%.

5. An optical demultiplexor as defined in claim 3, wherein at least one of the reflective elements is partially transmitting to provide a tap for allowing a small amount of light to be transmitted therethrough.

6. An optical demultiplexor as defined in claim 2, including means disposed at the output end for receiving separate optical beams of different wavelengths that have been demultiplexed by the single wavelength selective means.

7. An optical demultiplexor as defined in claim 3, wherein the means disposed at the output end for receiving separate optical beams comprise plurality of output ports.

8. An optical demultiplexor as defined in claim 4, comprising reflecting means disposed between the single wavelength selective means and the output end, for guiding demultiplexed light passing through the single wavelength selective means to the plurality of output ports, wherein predetermined wavelengths of light are guided to predetermined output ports.

9. An optical demultiplexor as defined in claim 5, wherein the reflecting means comprise a plurality of substantially planar reflecting surfaces.

10. An optical demultiplexor comprising:

a housing having an input end and an output end, the input end having an upstanding endwall;

single wavelength selective means disposed between the input end and the output end, said single wavelength selective means having a wavelength characteristic dependent upon an angle of incidence for transmitting light of a first predetermined wavelength incident at a first predetermined angle to pass therethrough and for other wavelengths of light incident at the first predetermined angle, and said single wavelength selective means for passing a plurality of other predetermined different wavelengths of light incident thereupon, at a plurality of other predetermined angles respectively and reflecting other wavelengths of light incident upon said means at the plurality of other predetermined angles respectively;

an input port at the input end for launching a collimated beam toward the single wavelength selective means at the first predetermined angle to allow a first predetermined wavelength of light to pass therethrough;

a first wavelength independent reflective means defined within the upstanding wall, positioned to direct at least a portion of the collimated beam reflected from the wavelength selective means, back to the wavelength selective means at a second, different, predetermined incident angle being dependent upon the angle of incidence and independent of wavelength to allow a second predetermined wavelength of light to pass through said single wavelength selective means;

a second wavelength independent reflective means defined within the upstanding wall, positioned to direct at least a portion of the collimated beam reflected from the single wavelength selective means, back to the single wavelength selective means at a third, different, predetermined incident angle being dependent upon the angle of incidence and independent of wavelength to allow a third predetermined wavelength of light to pass through said single wavelength selective means; and, a third wavelength independent reflective means defined within the upstanding wall, positioned to direct at least a portion of the collimated beam reflected from the wavelength selective means, back to the single wavelength selective means at a fourth, different, predetermined incident angle being dependent upon the angle of incidence and independent of wavelength to allow a fourth predetermined wavelength of light to pass through said single wavelength selective means.

11. An optical demultiplexor as defined in claim 10, wherein the first and second reflective means are provided by polishing an outside face of the upstanding wall in such a manner as to create two facets within the wall, at least a portion of the wall being substantially transparent.

12. An optical demultiplexor as defined in claim 10, wherein the reflective means comprise substantially reflective coated outer non-parallel planar surfaces of the upstanding wall.

13. An optical demultiplexor comprising:

an input and an output end;

a single wavelength selective means for carrying out multiple reflections of a composite light beam on a first surface to separate out wavelengths from the composite light beam dependent upon a different angle of incidence for each wavelength to allow passage of a respective wavelength at a particular angle of incidence while reflecting all other wavelengths, said wavelength selective means being disposed between the input and the output end, an input port at the input end for launching a composite light beam toward the wavelength selective means at a first predetermined angle to allow a first predetermined wavelength of light to pass therethrough;

a plurality of reflective means, for directing at least a portion of the composite light beam reflected from the wavelength selective means, back to the wavelength selective means each reflective means reflecting said composite light beam at a predetermined angle to allow a plurality of different predetermined wavelengths of light to pass through said wavelength selective means at a plurality of different angles; said reflective means being positioned between the input port and the wavelength selective means a plurality of ports disposed at or near the output end to receive the different predetermined wavelengths of light to pass through the wavelength selective means.

14. An optical demultiplexor as defined in claim 13, wherein the reflective means comprise a plurality of reflecting surfaces at least one of which is partially transmitting to allow some light to pass therethrough.

15. An optical demultiplexor as defined in claim 1, wherein the single wavelength selective means is an optical interference filter.

16. An optical demultiplexor as defined in claim 15, wherein an endface surface area of the optical interference filter is approximately between 1.5 and 10 times the size of the beam launched from the input port toward the endface of the optical interference filter.

17. An optical demultiplexor as defined in claim 1, including: a first substantially transparent block of material having an end defining the input end and having an other end;

a second substantially transparent block of material having an end defining the output end, and having an other end;

the single wavelength selective means being disposed between the other end of the first block of material and the other end of the second block of material.

18. An optical demultiplexor as defined in claim 17, wherein the first and second blocks of material are comprised of glass.

19. An optical demultiplexor arranged to demultiplex and incoming composite waveform into a plurality of second wavelengths, said optical demultiplexor comprising:

an input portion;

output portion;

single wavelength selective means for splitting said composite waveform, said single wavelength select means being positioned between said input portion and said output portion, said singe wavelength selective means having a first surface configured to pass each wavelength of said composite waveform at a single separate angle of incidence, different for each wavelength, while reflecting all other wavelengths;

said input portion comprising means for guiding said composite waveform to said first surface at a first angle of incidence; and, a plurality of single discrete reflecting surfaces, positioned between said input portion and said single wavelength selective means, each said reflecting surface arranged to reflect a composite waveform from said first surface at one of a plurality of angles of incidence to said first surface in order to pass one of the wavelengths through said single wavelength selective means, wherein all of said wavelengths are sequentially passed through said single wavelength selective means by means of a plurality of reflections from said first surface to said plurality of separate discrete reflectors.

* * * * *